(12) United States Patent
Vosoughi et al.

(10) Patent No.: US 11,109,071 B2
(45) Date of Patent: Aug. 31, 2021

(54) METHOD AND APPARATUS FOR DYNAMIC POINT CLOUD PARTITION PACKING

(71) Applicant: TENCENT AMERICA LLC, Palo Alto, CA (US)

(72) Inventors: Arash Vosoughi, San Jose, CA (US); Sehoon Yea, Palo Alto, CA (US); Shan Liu, San Jose, CA (US); Byeongdoo Choi, Palo Alto, CA (US); Stephan Wenger, Hillsborough, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/738,287

(22) Filed: Jan. 9, 2020

(65) Prior Publication Data

US 2020/0221139 A1     Jul. 9, 2020

Related U.S. Application Data

(60) Provisional application No. 62/790,446, filed on Jan. 9, 2019, provisional application No. 62/854,953, filed
(Continued)

(51) Int. Cl.
| | |
|---|---|
| *H04N 19/91* | (2014.01) |
| *H04N 19/167* | (2014.01) |
| *H04N 19/119* | (2014.01) |
| *H04N 19/172* | (2014.01) |

(52) U.S. Cl.
CPC ........... *H04N 19/91* (2014.11); *H04N 19/119* (2014.11); *H04N 19/167* (2014.11); *H04N 19/172* (2014.11)

(58) Field of Classification Search
CPC .... H04N 19/91; H04N 19/167; H04N 19/119; H04N 19/172; H04N 19/17
See application file for complete search history.

(56) References Cited

U.S. PATENT DOCUMENTS

| | | |
|---|---|---|
| 2008/0123961 A1 | 5/2008 | Nelson |
| 2017/0347120 A1* | 11/2017 | Chou ................... H04N 19/147 |

(Continued)

FOREIGN PATENT DOCUMENTS

WO      2017/191643 A1      11/2017

OTHER PUBLICATIONS

Limper M. et al. "Box Cutter: Atlas Refinement for Efficient Packing via Void Elimination" ACM Trans. Graph., vol. 37, No. 4, Article 153, Aug. 2018 (Year: 2018).*

(Continued)

*Primary Examiner* — Richard A Hansell, Jr.
(74) *Attorney, Agent, or Firm* — Sughrue Mion, PLLC

(57) ABSTRACT

A method of dynamic point cloud partition packing is by at least one processor and includes obtaining one or more region of interest (ROI) patches from an ROI of a point cloud, and attempting to pack, into one among tiles of a tile map, one among the obtained one or more ROI patches, in a tile scan order. The method further includes identifying whether the one among the one or more ROI patches is packed successfully into the one among the tiles, and based on the one among the one or more ROI patches being determined to be not packed successfully into the one among the tiles, chunking the one among the one or more ROI patches into multiple ROI patches.

11 Claims, 10 Drawing Sheets

Related U.S. Application Data on May 30, 2019, provisional application No. 62/870,319, filed on Jul. 3, 2019.

(56) References Cited

U.S. PATENT DOCUMENTS

| | | | |
|---|---|---|---|
| 2017/0347122 A1* | 11/2017 | Chou | H04N 19/36 |
| 2018/0268570 A1* | 9/2018 | Budagavi | G06T 9/001 |
| 2019/0122393 A1* | 4/2019 | Sinharoy | G06K 9/6202 |
| 2019/0318488 A1* | 10/2019 | Lim | G06K 9/00208 |
| 2020/0020132 A1* | 1/2020 | Sinharoy | G06T 9/00 |
| 2020/0045290 A1* | 2/2020 | Ruhm | H04N 13/161 |
| 2020/0221134 A1* | 7/2020 | Faramarzi | H04N 19/597 |
| 2020/0302680 A1* | 9/2020 | Yip | H04N 21/23412 |
| 2020/0314449 A1* | 10/2020 | Fleureau | H04N 19/597 |

OTHER PUBLICATIONS

Khaled Mammou et al., "Point Cloud Compression: Test Model Category 2 version 0.0", ISO/IEC JTC1/SC29/WG11 m41920, Oct. 2017, 8 pgs., Macau, China.

Rufael Mekuria et al., "Requirements for Point Cloud Compression", ISO/IEC JTC1/SC29/WG11 MPEG2016/n16330, Feb. 2016, 3 pgs., Geneva, CH.

Christian Tulvan et al., "Use Cases for Point Cloud Compression (PCC)", ISO/IEC JTC1/SC29/WG11 MPEG2015/ N16331, Jun. 2016, 8 pgs., Geneva, CH.

Schwarz et al. "Emerging MPEG Standards for Point Cloud Compression", IEEE Journal on Emerging and Selected Topics in Circuits and Systems, vol. 9, No. 1, Mar. 2019, pp. 133-148.

Xu et al., "Introduction to Point Cloud Compression", ZTE Communications, vol. 16, No. 3, Sep. 2018, pp. 3-8.

"The Tilemap bar", Construct, Aug. 11, 2017, Retrieved from <http://www.construct.net/en/make-games/manuals/constnjct-3/interface/bars/tilemap-bar>, pp. 1-3.

Wang et al., "Separating Tree Photosynthetic and Non-Photosynthetic Components from Point Cloud Data Using Dynamic Segment Merging", MDPI, Forests, vol. 9, No. 252, 2018, pp. 1-23 (24 pages total).

International Search Report dated Apr. 1, 2020 from the International Searching Authority in International Application No. PCT/US2020/012844.

Written Opinion dated Apr. 1, 2020 from the International Searching Authority in International Application No. PCT/US2020/012844.

\* cited by examiner

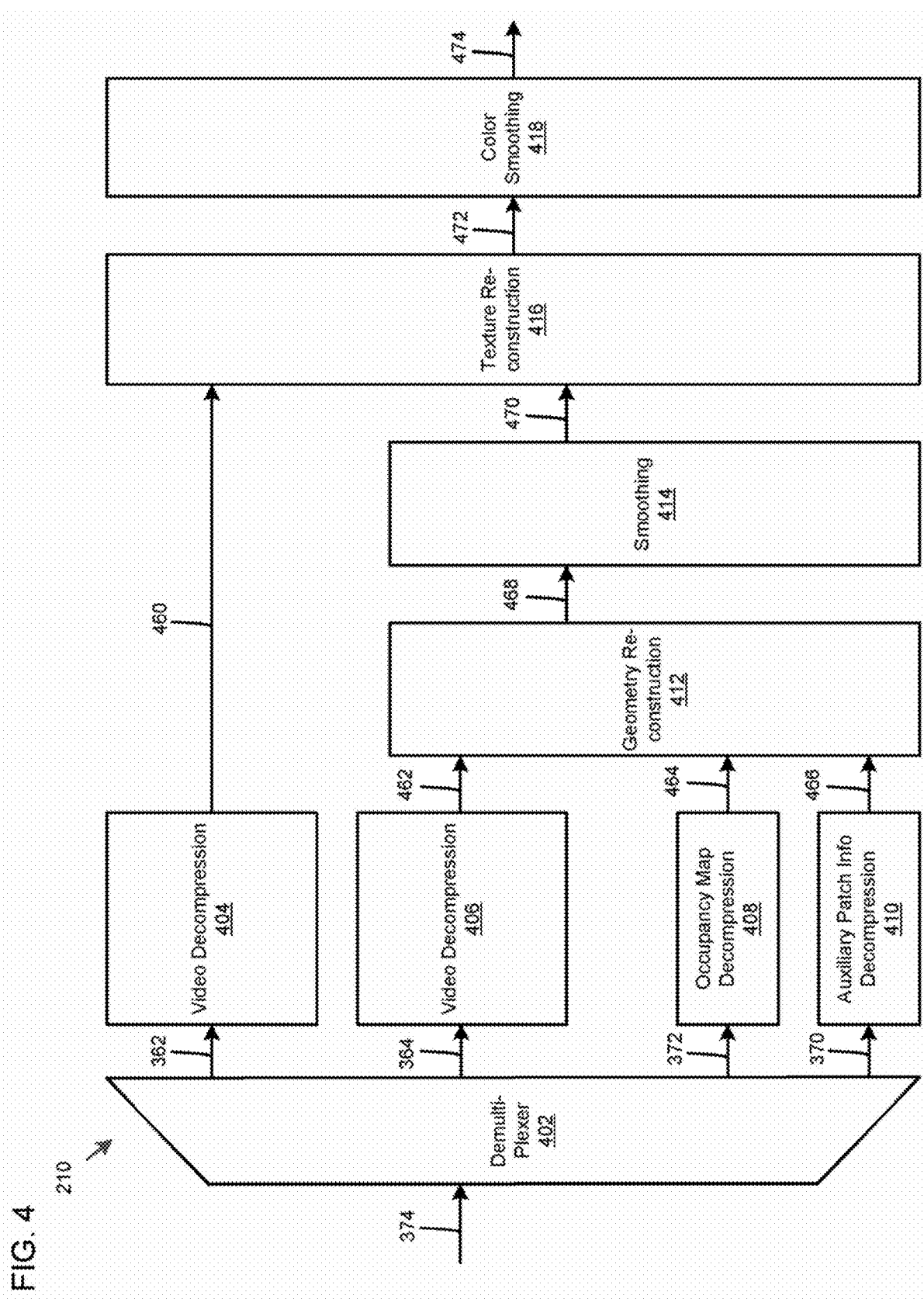

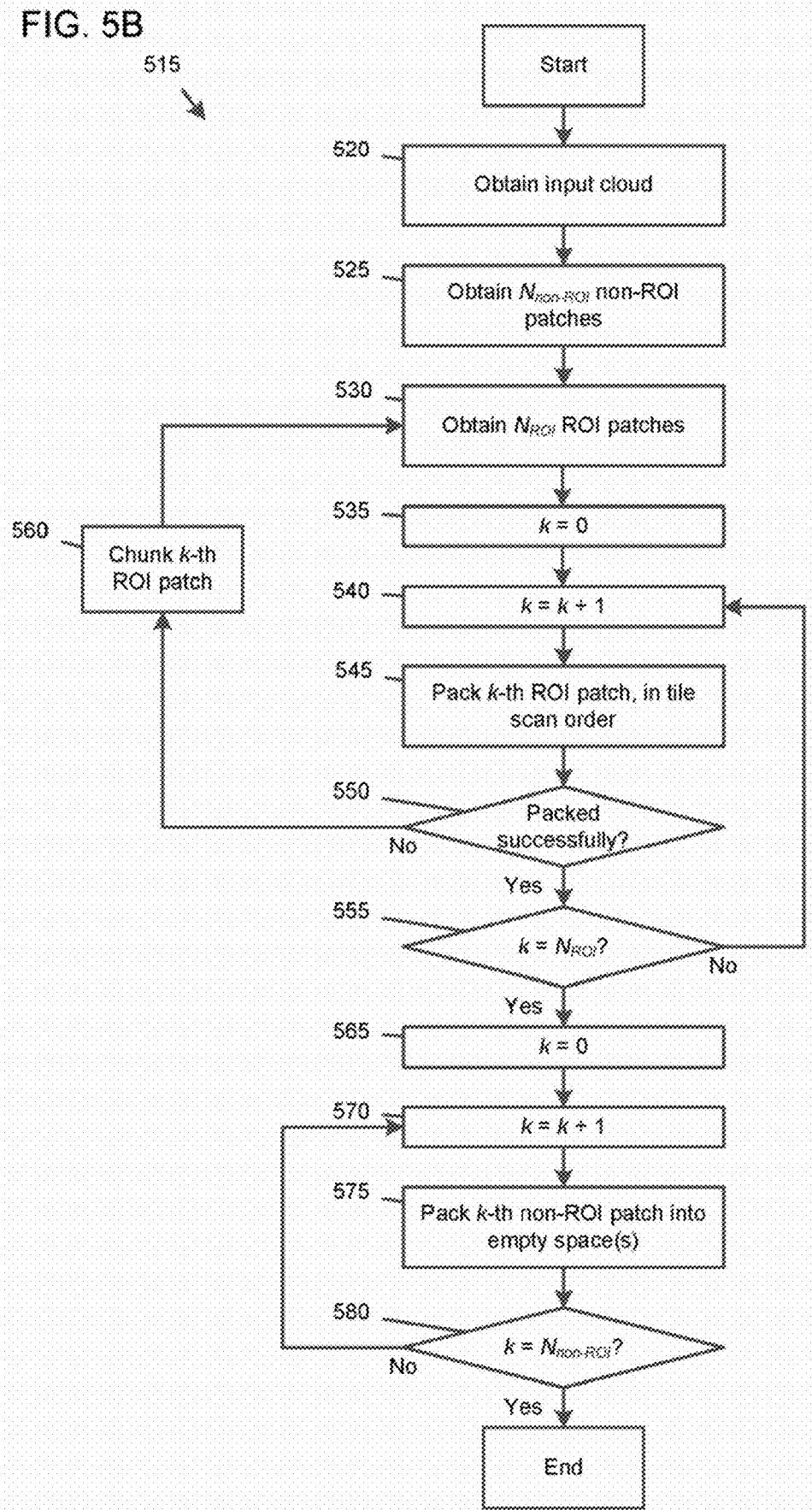

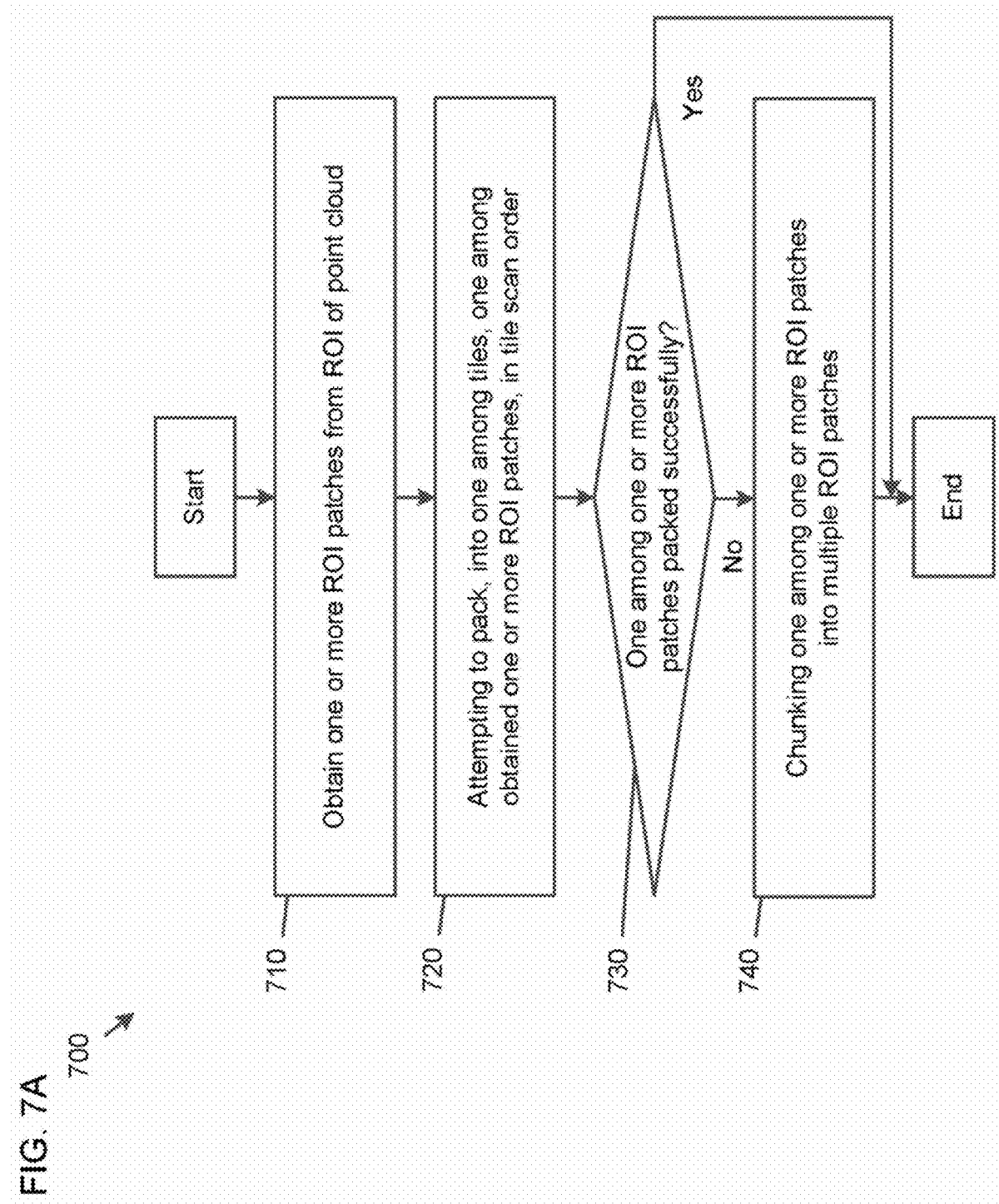

METHOD AND APPARATUS FOR DYNAMIC POINT CLOUD PARTITION PACKING

CROSS-REFERENCE TO RELATED APPLICATION

This application claims priority from U.S. Provisional Patent Application No. 62/790,446, filed on Jan. 9, 2019, in the U.S. Patent and Trademark Office, U.S. Provisional Patent Application No. 62/854,953, filed on May 30, 2019, in the U.S. Patent and Trademark Office, and U.S. Provisional Patent Application No. 62/870,319, filed on Jul. 3, 2019, in the U.S. Patent and Trademark Office, the disclosures of which are incorporated herein by reference in their entireties.

BACKGROUND

1. Field

Methods and apparatuses consistent with embodiments relate to point cloud compression (PCC), and more particularly, a method and an apparatus for dynamic point cloud partition packing.

2. Description of Related Art

Advanced three-dimensional (3D) representations of the world are enabling more immersive forms of interaction and communication, and also allow machines to understand, interpret and navigate our world. 3D point clouds have emerged as an enabling representation of such information. A number of use cases associated with point cloud data have been identified, and corresponding requirements for point cloud representation and compression have been developed.

A point cloud is a set of points in a 3D space, each with associated attributes, e.g., color, material properties, etc. Point clouds can be used to reconstruct an object or a scene as a composition of such points. They can be captured using multiple cameras and depth sensors in various setups, and may be made up of thousands up to billions of points to realistically represent reconstructed scenes.

Compression technologies are needed to reduce the amount of data to represent a point cloud. As such, technologies are needed for lossy compression of point clouds for use in real-time communications and six degrees of freedom (6DoF) virtual reality. In addition, technology is sought for lossless point cloud compression in the context of dynamic mapping for autonomous driving and cultural heritage applications, etc. The Moving Picture Experts Group (MPEG) has started working on a standard to address compression of geometry and attributes such as colors and reflectance, scalable/progressive coding, coding of sequences of point clouds captured over time, and random access to subsets of a point cloud.

For example, the MPEG has started working on video-based point cloud compression in Test Model 2 (V-PCC). The main philosophy behind V-PCC is to compress geometry, motion, and texture information of a dynamic point cloud as three separate video sequences. Extra metadata needed to interpret the three video sequences (i.e., occupancy map and auxiliary patch information) is compressed separately. The metadata represents a small amount of an overall bitstream, and could be efficiently encoded/decoded using a software implementation. A bulk of the metadata is handled by a video codec.

In content-aware point cloud compression using High Efficiency Video Coding (HEVC) tiles within a framework of V-PCC, a patch generation process aims at decomposing a point cloud into a minimum number of patches with smooth boundaries, while also minimizing reconstruction error. Encoders may implement various methods to generate such a decomposition.

A packing process aims at mapping extracted patches onto a two-dimensional (2D) grid, while minimizing an unused space and guaranteeing that every M×M (e.g., 16×16) block of the grid is associated with a unique patch. M is an encoder defined parameter that is encoded in a bitstream and sent to a decoder.

V-PCC uses a simple packing strategy that iteratively tries to insert patches into a w×h grid. w and h are user defined parameters that correspond to a resolution of geometry/texture/motion video images that will be encoded. A patch location is determined through an exhaustive search that is applied in a raster scan order. A first location that can guarantee an overlapping-free insertion of a patch is selected, and grid cells covered by the patch are marked as used. If no empty space in a current resolution image can fit a patch, then a height h of a grid is temporarily doubled, and search is applied again. At an end of the process, h is clipped to fit used grid cells. For a video sequence, a process that determines w and h for an entire group of pictures (GOP) is used.

V-PCC segments an input cloud into several patches, packs those patches into two 2D images (geometry and attributes), and then finally compresses those images using HEVC.

In detail, patch packing is followed by background filling (a.k.a. image padding) that simply fills the unused space by redundant information. A good background filling minimally increases a bit rate while not introducing significant coding distortion around patch boundaries.

An image generation process exploits a 3D to 2D mapping that is computed during the packing process to store a geometry and a texture of a point cloud as images. To better handle multiple points being projected to the same sample, each patch is projected onto two images, referred to as layers. A geometry image is represented by a monochromatic frame of W×H in YUV 4:2:0 8-bit format. The occupancy image consists of a binary map that indicates for each cell of a grid whether it belongs to an empty space or to a point cloud. To generate the texture image, a texture generation procedure exploits the reconstructed/smoothed geometry to compute colors to be associated with re-sampled points.

A smoothing procedure aims at alleviating potential discontinuities that may arise at patch boundaries due to compression artifacts.

Non-neighboring patches in a 3D space are often packed next to each other in 2D videos. This implies that pixel values from non-neighboring patches might be mixed up by a block-based video codec. Ae goal of color smoothing is to reduce visible artifacts that appear at patch boundaries.

Generated images/layers are stored as video frames and compressed using HEVC according to HEVC configurations provided as parameters.

SUMMARY

According to embodiments, a method of dynamic point cloud partition packing is by at least one processor and includes obtaining one or more region of interest (ROI) patches from an ROI of a point cloud, and attempting to pack, into one among tiles of a tile map, one among the obtained one or more ROI patches, in a tile scan order. The method further includes identifying whether the one among the one or more ROI patches is packed successfully into the one among the tiles, and based on the one among the one or more ROI patches being determined to be not packed successfully into the one among the tiles, chunking the one among the one or more ROI patches into multiple ROI patches.

According to embodiments, an apparatus for dynamic point cloud partition packing includes at least one memory configured to store computer program code, and at least one processor configured to access the at least one memory and operate according to the computer program code. The computer program code includes obtaining code configured to cause the at least one processor to obtain one or more region of interest (ROI) patches from an ROI of a point cloud, and packing code configured to cause the at least one processor to attempt to pack, into one among tiles of a tile map, one among the obtained one or more ROI patches, in a tile scan order. The computer program code further includes identifying code configured to cause the at least one processor to identify whether the one among the one or more ROI patches is packed successfully into the one among the tiles, and chunking code configured to cause the at least one processor to, based on the one among the one or more ROI patches being determined to be not packed successfully into the one among the tiles, chunk the one among the one or more ROI patches into multiple ROI patches.

According to embodiments, a non-transitory computer-readable storage medium stores instructions that cause at least one processor to obtain one or more region of interest (ROI) patches from an ROI of a point cloud, attempt to pack, into one among tiles of a tile map, one among the obtained one or more ROI patches, in a tile scan order, and identify whether the one among the one or more ROI patches is packed successfully into the one among the tiles. The instructions further cause the at least one processor to, based on the one among the one or more ROI patches being determined to be not packed successfully into the one among the tiles, chunk the one among the one or more ROI patches into multiple ROI patches.

BRIEF DESCRIPTION OF THE DRAWINGS

FIG. 4 is a functional block diagram of the PCC decompressor according to embodiments.

FIG. 5B is a flowchart illustrating a method of patch packing and chunking for a single region of interest (ROI) in content-aware point cloud compression (CA-PCC), according to embodiments.

FIG. 6A is a diagram illustrating a method of point cloud partition packing, according to embodiments.

FIG. 6B is a diagram illustrating a method of point cloud partition packing for motion-constrained tile sets (MCTS), according to embodiments.

FIG. 6C is a diagram illustrating a method of point cloud partition packing for tile groups, according to embodiments.

FIG. 7A is a flowchart illustrating a method of dynamic point cloud partition packing, according to embodiments.

DETAILED DESCRIPTION

Embodiments described herein provide a method and an apparatus for dynamic point cloud partition packing. Given a specification of an ROI in a form of a 3D bounding box, a content-aware point cloud compression system is desired to fulfill all or some of the below features:

1) the ROI is coded with a higher quality than other parts of a point cloud;

2) the ROI is coded independently from other parts of the point cloud to facilitate spatial random-access without full-decoding;

3) the independent coding of the ROI needs to be harmonized with any system requirements regarding independent (parallel) encoding/decoding; and 4) multiple ROIs need to be supported.

CA-PCC addresses all the above requirements. In CA-PCC, ROI chunking is performed to better pack a single ROI and multiple ROIs. The ROI chunking is a fully automatic process so that a number of chunks are derived automatically for each ROI cloud rather than set by a user.

Figure 1:
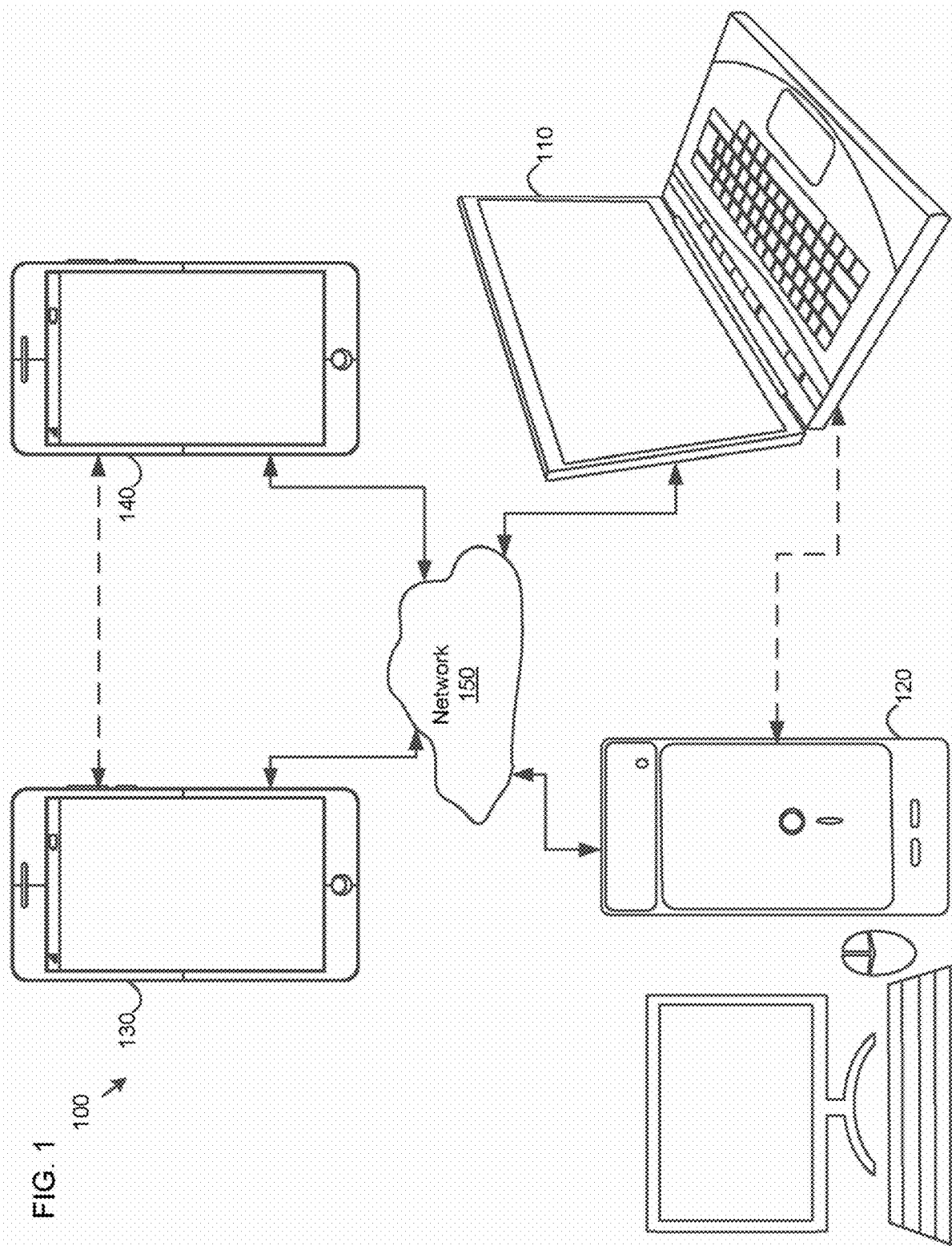
FIG. 1 is a block diagram of a communication system according to embodiments.

FIG. 1 is a block diagram of a communication system 100 according to embodiments. The communication system 100 may include at least two terminals 110 and 120 interconnected via a network 150. For unidirectional transmission of data, a first terminal 110 may code point cloud data at a local location for transmission to a second terminal 120 via the network 150. The second terminal 120 may receive the coded point cloud data of the first terminal 110 from the network 150, decode the coded point cloud data and display the decoded point cloud data. Unidirectional data transmission may be common in media serving applications and the like.

FIG. 1 further illustrates a second pair of terminals 130 and 140 provided to support bidirectional transmission of coded point cloud data that may occur, for example, during videoconferencing. For bidirectional transmission of data, each terminal 130 or 140 may code point cloud data captured at a local location for transmission to the other terminal via the network 150. Each terminal 130 or 140 also may receive the coded point cloud data transmitted by the other terminal, may decode the coded point cloud data and may display the decoded point cloud data at a local display device.

In FIG. 1, the terminals 110-140 may be illustrated as servers, personal computers and smartphones, but principles of the embodiments are not so limited. The embodiments find application with laptop computers, tablet computers, media players and/or dedicated video conferencing equipment. The network 150 represents any number of networks that convey coded point cloud data among the terminals 110-140, including for example wireline and/or wireless communication networks. The communication network 150 may exchange data in circuit-switched and/or packet-switched channels. Representative networks include telecommunications networks, local area networks, wide area networks and/or the Internet. For the purposes of the present discussion, an architecture and topology of the network 150 may be immaterial to an operation of the embodiments unless explained herein below.

Figure 2:
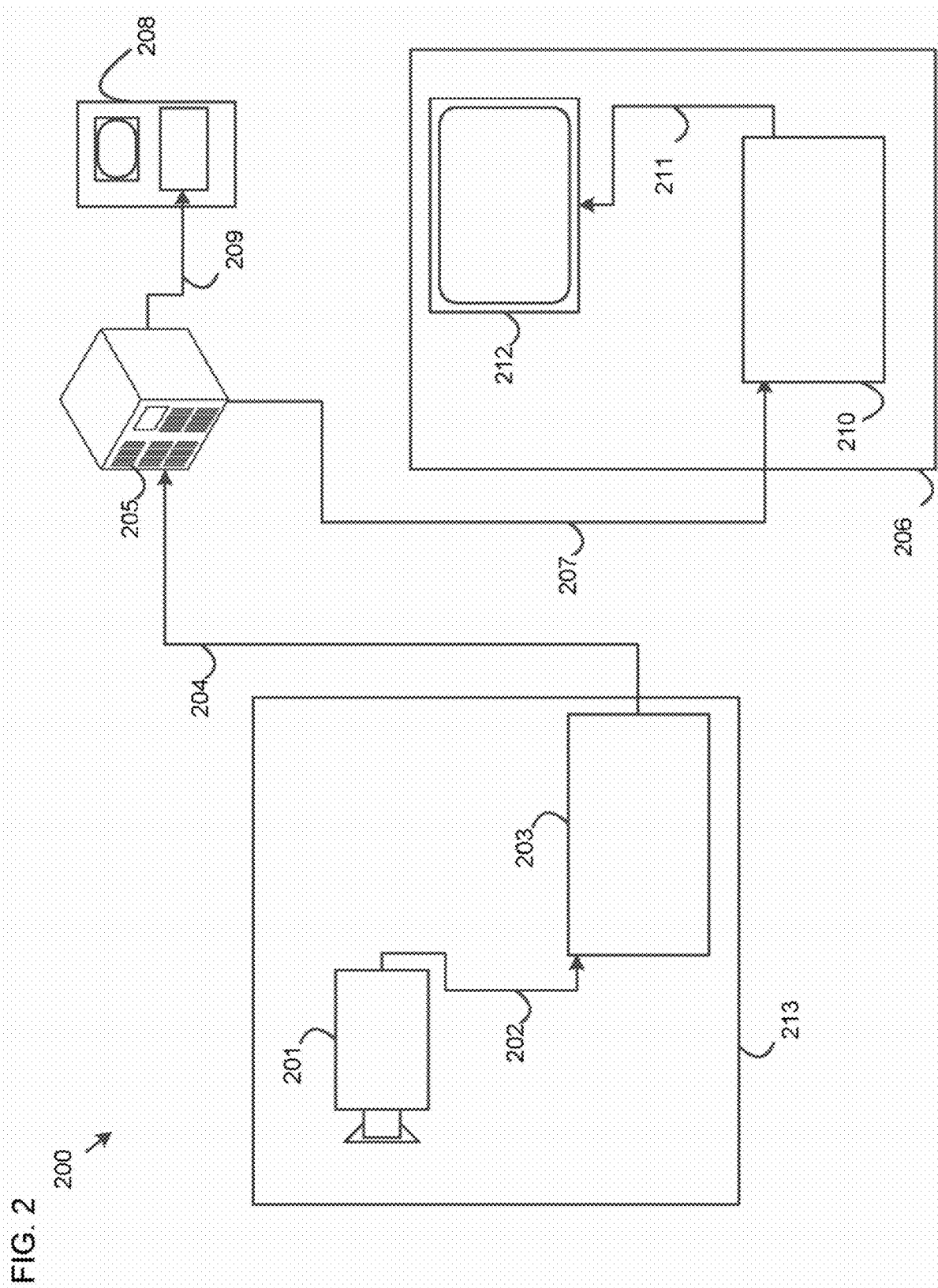
FIG. 2 is a diagram of a placement of a PCC compressor and a PCC decompressor in an environment, according to embodiments.

FIG. 2 is a diagram of a placement of a PCC compressor 203 and a PCC decompressor 210 in an environment, according to embodiments. The disclosed subject matter can be equally applicable to other point cloud enabled applications, including, for example, video conferencing, digital TV, storing of compressed point cloud data on digital media including CD, DVD, memory stick and the like, and so on.

A streaming system 200 may include a capture subsystem 213 that can include a point cloud source 201, for example a digital camera, creating, for example, uncompressed point cloud data 202. The point cloud data 202 having a higher data volume can be processed by the PCC compressor 203 coupled to the point cloud source 201. The PCC compressor 203 can include hardware, software, or a combination thereof to enable or implement aspects of the disclosed subject matter as described in more detail below. Encoded point cloud data 204 having a lower data volume can be stored on a streaming server 205 for future use. One or more streaming clients 206 and 208 can access the streaming server 205 to retrieve copies 207 and 209 of the encoded point cloud data 204. A client 206 can include the PCC decompressor 210, which decodes an incoming copy 207 of the encoded point cloud data and creates outgoing point cloud data 211 that can be rendered on a display 212 or other rendering devices (not depicted). In some streaming systems, the encoded point cloud data 204, 207 and 209 can be encoded according to video coding/compression standards. Examples of those standards include those being developed by MPEG for PCC.

Figure 3:
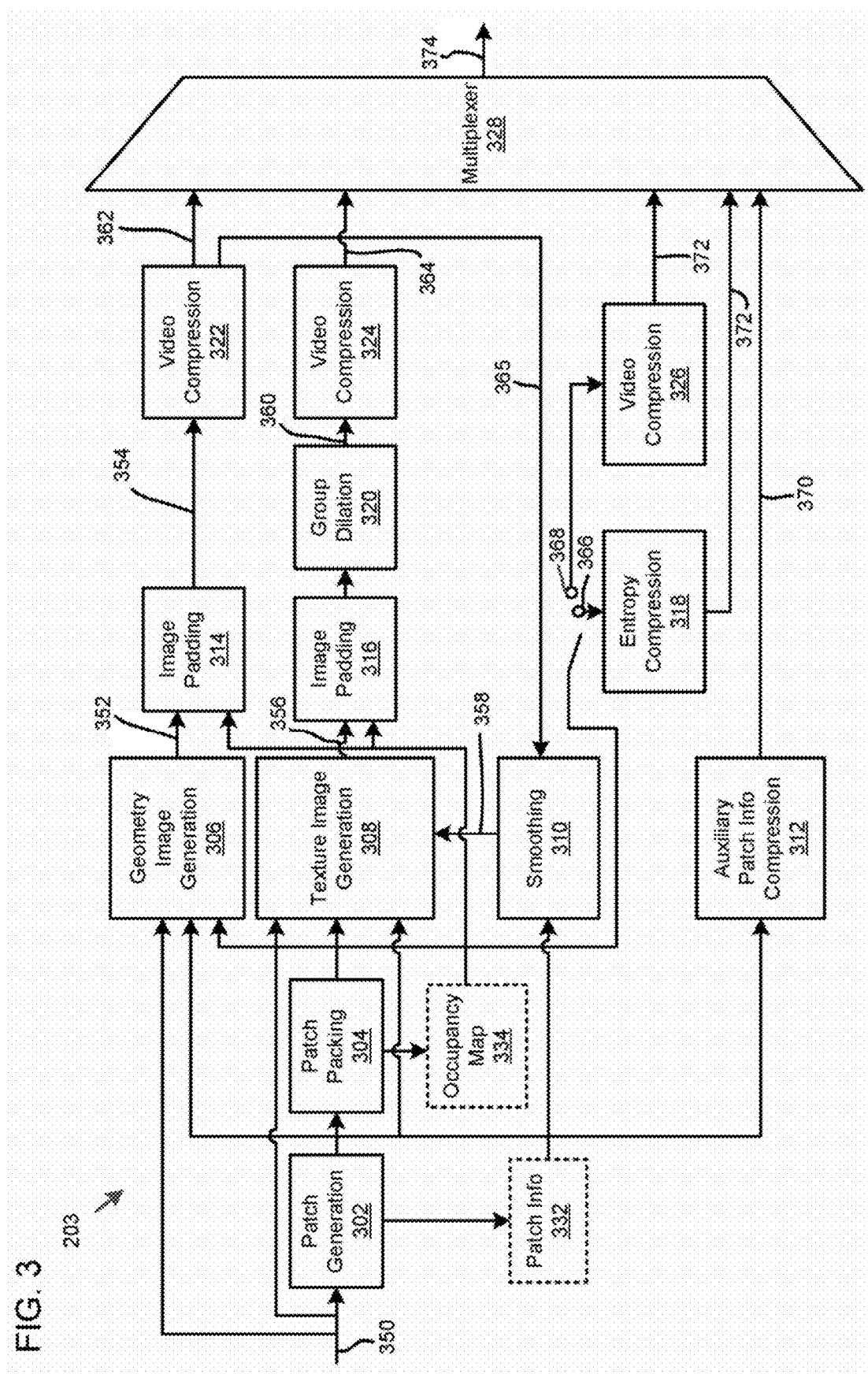
FIG. 3 is a functional block diagram of the PCC compressor according to embodiments.

FIG. 3 is a functional block diagram of the PCC compressor 203 according to embodiments.

As shown in FIG. 3, the PCC compressor 203 may receive a point cloud frame(s) 350, and generate a geometry image 352, a texture image 356, and an occupancy map 334 based on the point cloud frame 350. The PCC compressor 203 may compress the geometry image 352 into a compressed geometry image 362, the texture image 356 into a compressed texture image 364, and the occupancy map 334 into a compressed occupancy map 372. A multiplexer 328 of the PCC compressor 203 may form a compressed bitstream 374 that includes the compressed geometry image 362, the compressed texture image 364, and the compressed occupancy map 372.

More specifically, in embodiments, the PCC compressor 203 may include a patch generation module 302 that segments the point cloud frame 350 into patches. Patches are useful entities of PCC. The patch generation process includes decomposing the point cloud frame 350 into a minimum number of patches with smooth boundaries, while also minimizing the reconstruction error. Encoders of the present disclosure may implement various methods to generate such a decomposition.

The PCC compressor 203 may include a patch packing module 304 that performs a packing process. The packing process includes mapping the extracted patches onto a 2D grid while minimizing the unused space and guaranteeing that every M×M (e.g., 16×16) block of the grid is associated with a unique patch. Efficient patch packing directly impacts the compression efficiency either by minimizing the unused space or ensuring temporal consistency. The patch packing module 304 may generate the occupancy map 334.

The PCC compressor 203 may include a geometry image generation module 306 and a texture image generation module 308. In order to better handle the case of multiple points being projected to the same sample, each patch may be projected onto two images, referred to as layers. For example, the geometry image generation module 306 and the texture image generation module 308 may exploit the 3D to 2D mapping computed during the packing process of the patch packing module 304 to store the geometry and texture of the point cloud as images (a.k.a. layers). The generated images/layers may be stored as a video frame(s) and compressed using a video codec (e.g. HM video codec) according to configurations provided as parameters.

In embodiments, the geometry image generation module 306 generates the geometry image 352 and the texture image generation module 308 generates the texture image 356, based on the input point cloud frame 350 and the occupancy map 334. In an embodiment, the geometry image 352 may be represented by a monochromatic frame of W×H in YUV420-8 bit format. In an embodiment, the occupancy map 334 image consists of a binary map that indicates for each cell of the grid whether it belongs to the empty space or to the point cloud. To generate the texture image 356, the texture image generation module 308 may exploit the reconstructed/smoothed geometry 358 in order to compute the colors to be associated with the re-sampled points.

The PCC compressor 203 may also include an image padding module 314 and an image padding module 316 for padding the geometry image 352 and the texture image 356, respectively, to form a padded geometry image 354 and a padded texture image 360. The image padding (a.k.a. background filling) simply fills unused space of the images with redundant information. A good background filling is a one that minimally increases the bit rate while does not introduce significant coding distortion around the patch boundaries. The image padding module 314 and the image padding module 316 may use the occupancy map 334 to form the padded geometry image 354 and the padded texture image 360, respectively. In an embodiment, the PCC compressor 203 may include a group dilation module 320 to form the padded texture image 360.

The PCC compressor 203 may include a video compression module 322 and a video compression module 324 for compressing the padded geometry image 354 and the padded texture image 360 into the compressed geometry image 362 and the compressed texture image 364, respectively.

The PCC compressor 203 may include an entropy compression module 318 for lossless encoding 366 of the occupancy map 334 and a video compression module 326 for lossy encoding 368 of the occupancy map 334.

In embodiments, the PCC compressor 203 may include a smoothing module 310 for generating smoothed geometry 358 by using a reconstructed geometry image 365, provided by the video compression module 322, and patch info 332. The smoothing procedure of the smoothing module 310 may aim at alleviating potential discontinuities that may arise at the patch boundaries due to compression artifacts. The smoothed geometry 358 may be used by the texture image generation module 308 to generate the texture image 356.

The PCC compressor 203 may also include an auxiliary patch information compression module 312 for forming compressed auxiliary patch information 370 that is provided in the compressed bitstream 374 by the multiplexer 328.

FIG. 4 is a functional block diagram of the PCC decompressor 210 according to embodiments.

As shown in FIG. 4, the PCC decompressor 210 may receive the coded bitstream 374 from the PCC compressor 203 to obtain the compressed geometry image 362, the compressed texture image 364, the compressed occupancy map 372, and the compressed auxiliary patch information 370. The PCC decompressor 210 may decode the compressed geometry image 362, the compressed texture image 364, the compressed occupancy map 372, and the compressed auxiliary patch information 370 to obtain a decompressed texture image 460, a decompressed geometry image 462, a decompressed occupancy map 464, and decompressed auxiliary patch information 466, respectively. Following, the PCC decompressor 210 may generate a reconstructed point cloud 474 based on the decompressed texture image 460, the decompressed geometry image 462, the decompressed occupancy map 464, and the decompressed auxiliary patch information 466.

In embodiments, the PCC decompressor 210 may include a demultiplexer 402 that separates the compressed geometry image 362, the compressed texture image 364, the compressed occupancy map 372, and the compressed auxiliary patch information 370 of the compressed bitstream 374 received.

The PCC decompressor 210 may include a video decompression module 404, a video decompression module 406, an occupancy map decompression module 408, and an auxiliary patch information decompression module 410 that decode the compressed geometry image 362, the compressed texture image 364, the compressed occupancy map 372, and the compressed auxiliary patch information 370, respectively.

The PCC decompressor 210 may include a geometry reconstruction module 412 that obtains reconstructed (three dimensional) geometry 468 based on the decompressed geometry image 462, the decompressed occupancy map 464, and the decompressed auxiliary patch information 466.

The PCC decompressor 210 may include a smoothing module 414 that smoothes the reconstructed geometry 468 to obtain smoothed geometry 470. The smoothing procedure may aim at alleviating potential discontinuities that may arise at the patch boundaries due to compression artifacts.

The PCC decompressor 210 may include a texture reconstruction module 416 for obtaining reconstructed texture 472 based on the decompressed texture image 460 and the smoothed geometry 470.

The PCC decompressor 210 may include a color smoothing module 418 that smoothes the color of the reconstructed texture 472 to obtain a reconstructed point cloud 474. Non-neighboring patches in 3D space are often packed next to each other in 2D videos. This implies that pixel values from non-neighboring patches might be mixed up by the block-based video codec. The color smoothing of the color smoothing module 418 may aim to reduce the visible artifacts that appear at patch boundaries.

The method and the apparatus for dynamic point cloud partition packing will now be described in detail. Such a method and an apparatus may be implemented in the PCC compressor 203 described above, namely, the patch packing module 304. The method and the apparatus may also be implemented in PCC decompressor 210 described above, namely, the auxiliary patch information decompression module 410.

Single ROI

A single ROI is first considered. CA-PCC divides an input cloud into two clouds:

1) a non-ROI cloud that includes non-ROI points; and
2) an ROI cloud that includes ROI points.

CA-PCC changes a patch generation process so that patches for the ROI cloud and non-ROI cloud are generated independently. Doing this guarantees that any single patch entirely belongs either to the ROI cloud or the non-ROI cloud. This implicitly results in:

1) a set of ROI patches; and
2) a set of non-ROI patches.

CA-PCC packs all the ROI patches into as few tiles as possible, and a user typically sets a number of chunks the ROI cloud is divided into such that no ROI patches cross over HEVC tile boundaries. The embodiments described herein include a fully automatic ROI chunking method that derives the number of chunks the ROI cloud is divided into.

Following CA-PCC, all the ROI patches are first packed on a canvas with a constraint that each ROI patch is packed in one single tile. Once all the ROI patches are packed, the non-ROI patches are packed on remaining unoccupied areas of the canvas, where multiple tiles can cover a non-ROI patch.

Figure 5A:
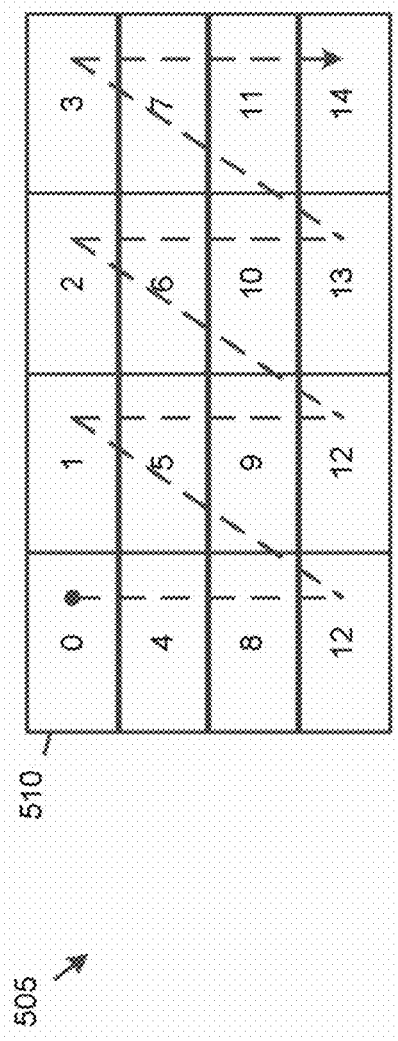
FIG. 5A is a diagram illustrating a patch packing order, according to embodiments.

FIG. 5A is a diagram illustrating a patch packing order, according to embodiments.

An arbitrary tile map may have a size W×H, where W is a width and H is a height. In FIG. 5A, a tile map 505 has a size 4×4 and includes 16 tiles 510.

A current ROI patch is fully packed in a single tile according to a tile scan order depicted in FIG. 5A as dashed lines. The tile scan order could be chosen arbitrarily.

If the current ROI patch does not fully fit inside an i-th tile, the current ROI is attempted to be fit into the (i+1)-th tile. If the current ROI patch does not fit inside any tile up to a last tile, the ROI patch is chunked into two or more smaller ROI sub-clouds. The ROI sub-clouds are each patched independently and packed one after the other following the above procedure. The chunking and patch generation are done recursively until any ROI patch is fully packed in a single tile.

FIG. 5B is a flowchart illustrating a method 515 of patch packing and chunking for a single ROI in CA-PCC, according to embodiments.

In some implementations, one or more process blocks of FIG. 5B may be performed by the PCC compressor 203. In some implementations, one or more process blocks of FIG. 5B may be performed by another device or a group of devices separate from or including the PCC compressor 203, such as the PCC decompressor 210.

Referring to FIG. 5B, in operation 520, the method 515 includes obtaining an input cloud including a non-ROI cloud and an ROI cloud that is specified by a 3D bounding box.

In operation 525, the method 515 includes obtaining a number $N_{non-ROI}$ of non-ROI patches from the non-ROI cloud.

In operation 530, the method 515 includes obtaining a number $N_{ROI}$ of ROI patches from the non-ROI cloud.

In operation 535, the method 515 includes setting a variable k to 0.

In operation 540, the method 515 includes incrementing the variable k to k+1.

In operation 545, the method 515 includes attempting to pack, into one among tiles of a tile map, a k-th ROI patch among the ROI patches, in a tile scan order. The packing is attempted in any tile up to a last tile.

In operation 550, the method 515 includes determining whether the k-th ROI patch is packed successfully into the tile. Based on the k-th ROI patch being determined to be packed successfully, the method 515 continues in operation 555. Otherwise, the method 515 continues in operation 560.

In operation 555, the method 515 includes determining whether the variable k is equal to the number $N_{ROI}$ of the ROI patches. Based on the variable k being determined to equal to the number $N_{ROI}$, the method 515 continues in operation 565. Otherwise, the method 515 returns to operation 540.

In operation 560, the method 515 includes chunking the k-th ROI patch into two or more ROI sub-clouds or patches. The method 515 then returns to operation 530.

In operation 565, the method 515 includes setting a variable k to 0.

In operation 570, the method 515 includes incrementing the variable k to k+1.

In operation 575, the method 515 includes packing, into empty space(s) of the tile map, a k-th non-ROI patch among the non-ROI patches.

In operation 580, the method 515 includes determining whether the variable k is equal to the number $N_{non-ROI}$ of the non-ROI patches. Based on the variable k being determined to equal to the number $N_{non-ROI}$, the method 515 ends. Otherwise, the method 515 returns to operation 570.

Although FIG. 5B shows example blocks of the method 515, in some implementations, the method 515 may include additional blocks, fewer blocks, different blocks, or differently arranged blocks than those depicted in FIG. 5B. Additionally, or alternatively, two or more of the blocks of the method 515 may be performed in parallel.

Further, the proposed methods may be implemented by processing circuitry (e.g., one or more processors or one or more integrated circuits). In an example, the one or more processors execute a program that is stored in a non-transitory computer-readable medium to perform one or more of the proposed methods.

To support random-access (i.e., independent decoding of an ROI cloud), indexes of tiles that cover ROI patches (roi_tile_indexes) are signaled. Having the indexes, a decoder (the PCC decompressor 210) can independently decode the ROI cloud.

Multiple ROIs

Multiple ROIs are now considered. Multiple sets of ROI patches (one set of ROI patches per ROI cloud) are created, rather that only a single set of ROI patches. These sets are packed one after the other following the algorithm described above with respect to a single ROI.

Figure 5C:
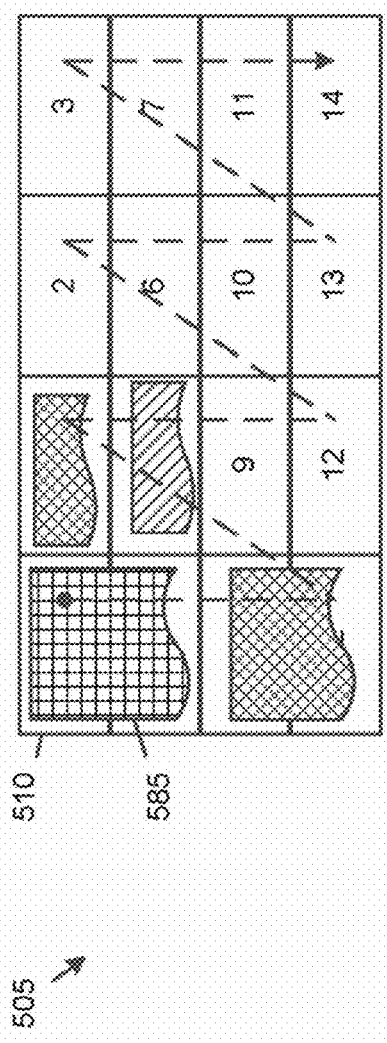
FIG. 5C is a diagram illustrating a method of patch packing for multiple ROIs in CA-PCC, according to embodiments.

FIG. 5C is a diagram illustrating a method of patch packing for multiple ROIs in CA-PCC, according to embodiments.

Referring to FIG. 5C, each hashing pattern 585 represents a set of patches of one ROI cloud. Multiple hashing patterns 585 representing sets of patches are packed one after the other following the algorithm described above with respect to a single ROI.

To support random-access (i.e., independently decoding each ROI cloud), each tile 510 covers ROI patches of at most one ROI cloud. For each ROI cloud, indexes of tiles covering the patches of that ROI (tile_indexes_per_roi) are signaled. Having the index tile_indexes_per_roi[i], a decoder (the PCC decompressor 210) can decode an i-th ROI cloud independently.

An illustrative syntax for patch packing and chunking in CA-PCC is shown in Table 1 below, with relevant semantics bolded:

TABLE 1

|  | Descriptor |
|---|---|
| content_aware_pcc_metadata ( ) { | |
|   if(content_aware_pcc_enabled_flag) { | |
|     content_aware_pcc_metadata_present_flag | u(1) |
|     if(content_aware_metadata_present_flag) { | |
|       for(t= 0; t < num_tiles_hor * num_tiles_ver; ++t) { | |
|         tile_scan_order[t] | u(8) |
|       } | |
|       for(r= 0; r < number_of_rois; ++r) { | |
|         for(t= 0; t < number_of_tiles_per_roi [r]; ++t) { | |
|           tile_indexes_per_roi[r][t] | u(8) |
|         } | |
|       } | |
|     } | |
|   } | |
| } | | content_aware_pcc_metadata_present_flag indicates whether any ROI (single or multiple) is present or not.

tile_scan_order[t] determines an index of a tile scanned at a t-th step of tile scanning to pack a current patch. Tiles are indexed in a raster-scan order epatocytes to num_tiles_hor*num_tiles_ver tiles−1. A value of tile_scan_order[t] shall be in a range [0, 1024], if a maximum number of tiles in horizontal and vertical directions is 32.

tile_indexes_per_roi[r][t] indicates a list of tiles that entirely cover an r-th ROI.

Decoding Process for Single ROI and Multiple ROIs

Inputs to a decoding process are:

1) a tile scan order (e.g. tile scan order in FIG. 5A is 0, 4, 8, 12, 1, 5, 13, 9, 2, . . . ); and 2) for each ROI, a list of tile indexes that entirely cover that ROI.

If a decoder (the PCC decompressor 210) wants to decode an r-th ROI, the decoder decodes the list of tile indexes that cover the r-th ROI. The decoder then derives a location of these ROI tiles, using the tile scan order. The ROI tiles are then decoded, and an ROI cloud is reconstructed consequently.

The embodiments described above include packing multiple partitions or ROIs within a framework of V-PCC or CA-PCC. Partitioning a point cloud into several partitions supports parallel (independent) encoding/decoding. In doing so, each 3D partition (sub-cloud) is independently patched to support parallel processing at a partition level. Resulting patches are then packed in 2D.

To maintain support of parallel processing (again at a partition level) at a video compression stage, and to enable independent decoding at a video layer, patches of each partition may be packed into an exclusive set of tiles, such that each tile is not allowed to have patches of more than one partition. This design supports parallel encoding/decoding at a partition level.

However, there is still an issue if MCTS or tile groups are used at a video compression stage. Consider an example in which an input cloud is partitioned into 4 partitions. Here, a size of partitions may change by time, and thus a number of tiles occupied by a partition may change consequently. Following the algorithm described above, each partition is patched independently and packed as shown in FIG. 6A.

Figures 6A, 6B, 6C:
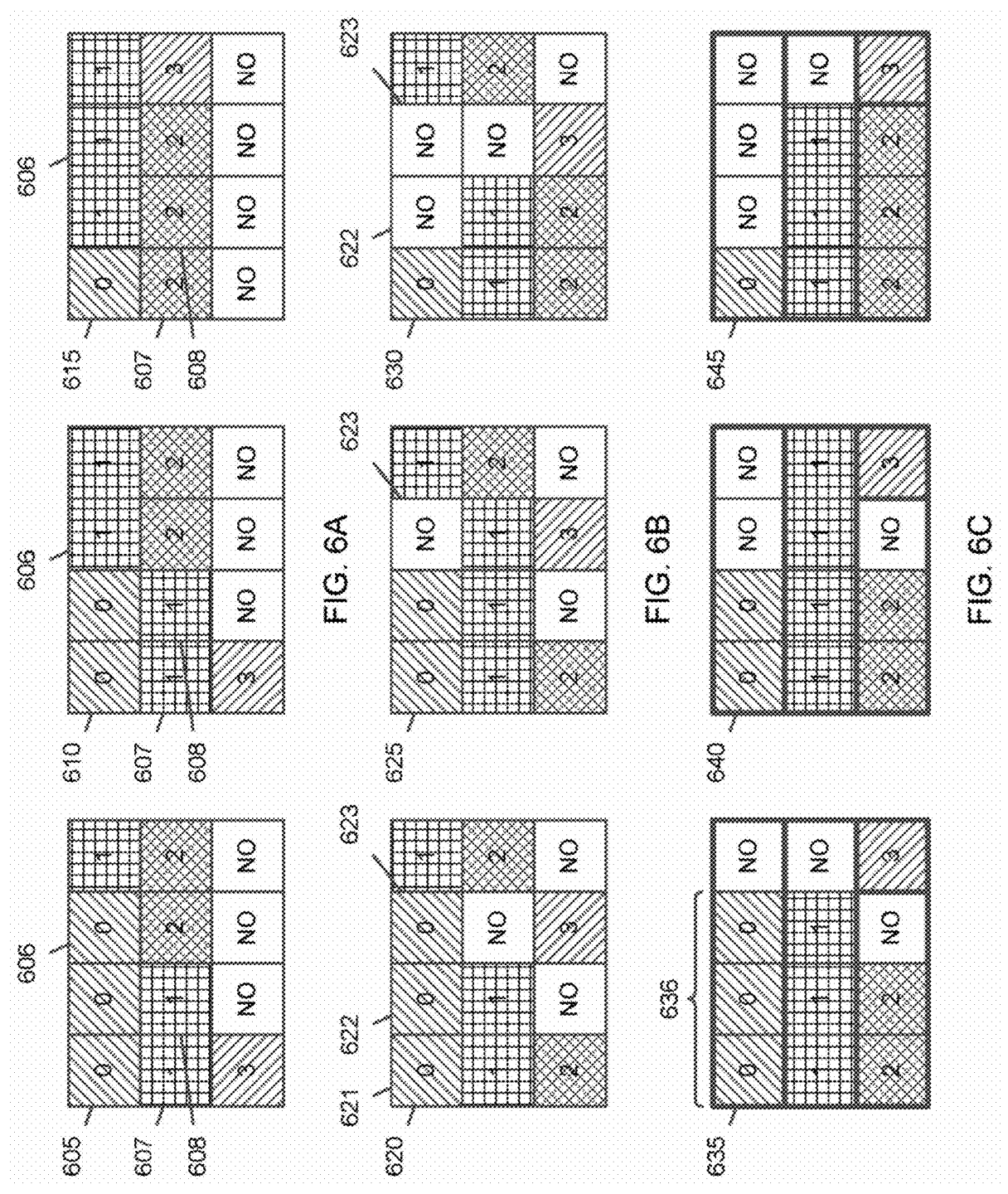

FIG. 6A is a diagram illustrating a method of point cloud partition packing, according to embodiments.

Referring to FIG. 6A, each of frames 605, 610 and 615 is packed independently. Each square in each of the frames 605, 610 and 615 represents a tile.

An input cloud is partitioned into four partitions that are respectively indicated by numbers 0, 1, 2 and 3. Each partition 0, 1, 2 or 3 is packed in an exclusive set of tiles not shared by other partitions. A number of tiles occupied by a partition may change in time as shown in the frames 605, 610 and 615 of different times.

Although parallel encoding/decoding is guaranteed here, MCTS or tile groups is not suitable for this scenario, because, for example, a tile 606 with an index 2 is occupied by the partition 0 in the frame 605, while it is occupied by the partition 1 in the frames 610 and 615. In another example, tiles 607 and 608 with indices 4 and 5 (in a raster scan order) contain patches of the partition 1 in the frames 605 and 610, while they contain patches of the partition 2 in the frame 615.

That is, for MCTS or tile groups, motion prediction is restricted to one tile or one tile group, and that tile or tile group should contain patches of only one partition. Otherwise, a benefit of motion prediction may be lost. To take advantage of MCTS or tile groups, it is desired that a tile contains patches of an identical partition from frame to frame.

Partition Packing of Dynamic Clouds with Support of MCTS

In embodiments, to support MCTS, patch packing is performed at a group of frames (GOF) level. This can also be done at a sequence level if an encoder's latency is not an issue. Let P denote a number of partitions and F be a number of frames of a GOF. Also, a number of tiles occupied by a p-th partition in an f-th frame is denoted by NT(p, f). A maximum number of tiles (in a frame) needed to pack patches of the p-th partition is determined by:

$$NT_{GOF}(p) = \max_{f \in \{0,1,2,\ldots,GOF-1\}} \{NT(p, f)\}, 0 \le p \le P - 1. \quad (1)$$

Once the maximum number of tiles $NT_{GOF}(P)$ is determined for $0 \le p \le P-1$, starting from a top-left tile, tiles with index 0 (following the raster scan order) to index $NT_{GOF}(0)-1$ are allocated to partition 0. Then, tiles with index $NT_{GOF}(0)$ to index $NT_{GOF}(0)+NT_{GOF}(1)-1$ are allocated to partition 1. In general, tiles with index $\Sigma_{i=0}^{p-1}NT_{GOF}(i)$ to index $\Sigma_{i=0}^{p}NT_{GOF}(i)-1$ are allocated to partition p. This process ensures that the same set of tiles are used for each partition throughout the GOF no matter how a size of a partition changes in time. FIG. 6B shows a rearrangement of tiles for the scenario depicted in FIG. 6A.

FIG. 6B is a diagram illustrating a method of point cloud partition packing for MCTS, according to embodiments.

Referring to FIG. 6B, a tile is occupied by the same partition throughout a GOF including, e.g., frames 620, 625 and 630. As an example, consider partition 0. A maximum number of tiles occupied by the partition 0 is 3, and thus first 3 tiles 621, 622 and 623 of the frame 620 are allocated to the partition 0.

An occupancy map may be consequently changed in the frames 625 and 630. Considering partition 0 again, the tile 623 with index 2 is set to be unoccupied or not occupied (NO) in the frame 625, and the tiles 622 and 623 respectively with indices 1 and 2 are set to be unoccupied or not occupied in the frame 630. Accordingly, a same set of tiles are always used for a specific partition, which is suitable for MCTS.

In embodiments, spatial consistency algorithms are applied for each partition independently only within tiles occupied by that partition. The spatial consistency algorithms are deployed in V-PCC to align patches temporally to improve a video codec's inter prediction.

Partition Packing of Dynamic Clouds with Support of Tile Groups

A tile group is a rectangular region that may contain one or more tiles. Each tile group can be decoded independently. To make the above algorithm compatible with tile groups, an encoder rearranges tiles so that each tile group contains tiles of only one partition for all frames in a GOF. This can be done by the encoder in any desired way depending on whether a tile group map is specified by a system or not. FIG. 6C shows a rearrangement of tiles depicted in FIG. 6B into four tile groups.

FIG. 6C is a diagram illustrating a method of point cloud partition packing for tile groups, according to embodiments.

Referring to FIG. 6C, tiles are arranged into four tile groups that are marked by thick solid lines. Each tile group is a rectangular region that contains tiles of only one partition and remains the same for all of frames 635, 640 and 645. For example, as shown in FIG. 6C, a first tile group includes four tiles of only partition 0, a second tile group includes four tiles of only partition 1, a third tile group includes three tiles of only partition 2 and a fourth tile group includes one tile of only partition 3.

As long as an encoder ensures that each tile group can (area-wise) fit all tiles of a partition, a shape of tile groups and their location inside a frame is arbitrary and up to the encoder or system requirements.

In embodiments, spatial consistency algorithms for each partition are independently applied only within a tile group occupied by that partition.

Super Bounding Box

A bounding box of a point cloud may change drastically in time. Two consequences are that a bounding box associated with a partition can vary significantly in time, and a partition may be packed into a different number of tiles from frame to frame. As discussed, a tile group may be used to pack patches of a single partition. Even using tile groups, no matter how big a partition is, its bounding box may dramatically change in time. Independently decoding at a partition level may be performed, while inter prediction is constrained to only a single partition.

A single super bounding box is also associated with each tile group that fully contains all bounding boxes of a partition in time. Having this super bounding box decoded, a decoder can decide either to fully decode or entirely skip decoding a partition at a coded point cloud sequence (CPCS) level. Minor syntax is also introduced to help the decoder skip decoding of some of unoccupied tiles within a tile group.

In detail, a partition P may be packed into a single tile group denoted by $TG_P$. Uniform tiling is assumed, in which tile dimensions are $T_W$ and $T_H$. For each frame, patches of the partition P are first packed into tiles of size $T_W \times T_H$, as similarly shown in FIG. 6A.

A minimum number of tiles needed to pack the patches of the partition P in a frame i may be denoted by $N_i$. The minimum number $N_i$ may change from frame to frame because a bounding box of the partition P changes in time. To make the tile group $TG_P$ contain only the patches of the partition P, the tile group $TG_P$ is required to span at least a maximum number $$N_{max} = \max_i N_i$$

of tiles. As long as the tile group $TG_P$ spans the maximum number $N_{max}$ of tiles, a shape of the tile group is arbitrary and could be determined by an encoder, as shown in FIG. 6C. The tile group $TG_P$ having a size of the maximum number $N_{max}$ of tiles guarantees that the partition P is entirely packed in the tile group $TG_P$, and a minimum size tile group that can fit the partition P at all frames. This consequently enables independent decoding of the partition P, and realizes inter prediction within a single partition. It is worth noting that a tile group may contain a number of tiles not occupied by any patches.

Embodiments described herein include two sets of syntax elements.

First, at a CPCS level, indices of occupied tiles for each tile group are signaled by an encoder to a decoder. This can tell the decoder to skip decoding of unoccupied tiles.

Second, at the CPCS level, a super bounding box $BB_{TG}$ for each tile group $TG_P$ is signaled by the encoder to the decoder. This super bounding box fully contains all bounding boxes of a partition P at all frames. More precisely, a bounding box of an i-th frame may be denoted by $BB_i = [x_{min}, x_{max}, y_{min}, y_{max}, z_{min}, z_{max}]_i$. The super bounding box $BB_{TG}$ is then calculated by:

$$BB_{TG} = \left[\min_i BB_i[0], \max_i BB_i[1], \min_i BB_i[2], \max_i BB_i[3], \min_i BB_i[4], \max_i BB_i[5]\right]. \tag{2}$$

Having the super bounding box $BB_{TG}$ decoded, the decoder can decide either to decode or entirely skip decoding of the partition at a video codec layer.

For example, referring to FIG. 6C, a super bounding box 636 for a tile group of partition 0 includes first 3 tiles from a top-left tile, as shown with respect to the frame 635. Having the super bounding box 636, a decoder may decode the partition 0 for the frame 635, but may skip decoding of the partition 0 for the frames 640 and 645.

An illustrative syntax for partition packing group tile groups is shown in Table 2 below, with relevant semantics bolded:

TABLE 2

|  | Descriptor |
| --- | --- |
| patch_frame_tile_information( ) { |  |
|     pfti_single_tile_in_patch_frame_flag | u(1) |
|     if( !pfti_single_tile_in_patch_frame_flag ) { |  |
|         pfti_uniform_tile_spacing_flag | u(1) |
|         if( pfti_uniform_tile_spacing_flag ) { |  |
|             pfti_tile_col_width_minus1 | ue(v) |
|             pfti_tile_row_height_minus1 | ue(v) |
|         } else { |  |
|             pfti_num_tile_columns_minus1 | ue(v) |
|             pfti_num_tile_rows_minus1 | ue(v) |
|             for( i = 0; i < pfti_num_tile_columns_minus1; i++ ) |  |
|                 pfti_tile_column_width_minus1[ i ] | ue(v) |
|             for( i = 0; i < pfti_num_tile_rows_minus1; i++ ) |  |
|                 pfti_tile_row_height_minus1[ i ] | ue(v) |
|         } |  |
|     } |  |
|     partitions_present_flag | u(1) |
|     pfti_single_tile_per_tile_group_flag | u(1) |
|     if( !pfti_single_tile_per_tile_group_flag ) { |  |
|         pfti_num_tile_groups_in_patch_frame_minus1 | ue(v) |
|         for( i = 0; i <= pfti_num_tile_groups_in_patch_frame_minus1; i++ ) { |  |
|             if( i > 0 ) |  |
|                 pfti_top_left_tile_idx[ i ] | u(v) |
|             pfti_bottom_right_tile_idx_delta[ i ] | u(v) |
|             if( partitions_present_flag ) { |  |
|                 tile_group_num_occupied_tiles_minus1[ i ] | ue(v) |
|                 for( j = 0; j <= tile_group_num_occupied_tiles_minus1; j++ ) { |  |
|                     tile_group_occupied_tile_index[ i ][ j ] | ue(v) |
|                 } |  |
|                 tile_group_bounding_box_min_x[ i ] | ue(v) |
|                 tile_group_bounding_box_max_x[ i ] | ue(v) |
|                 tile_group_bounding_box_min_y[ i ] | ue(v) |

TABLE 2-continued

|  | Descriptor |
|---|---|
|       tile_group_bounding_box_max_y[ i ] | ue(v) |
|       tile_group_bounding_box_min_z[ i ] | ue(v) |
|       tile_group_bounding_box_max_z[ i ] | ue(v) |
|     } | |
|   } | |
| } | |
| if ( pfti_single_tile_per_tile_group_flag && partitions_present_flag ) { | |
|   tile_group_bounding_box_min_x | ue(v) |
|   tile_group_bounding_box_max_x | ue(v) |
|   tile_group_bounding_box_min_y | ue(v) |
|   tile_group_bounding_box_max_y | ue(v) |
|   tile_group_bounding_box_min_z | ue(v) |
|   tile_group_bounding_box_max_z | ue(v) |
| } | |
| pfti_signalled_tile_group_id_flag | u(1) |
| if( pfti_signalled_tile_group_id_flag ) { | |
|   pfti_signalled_tile_group_id_length_minus1 | ue(v) |
|   for( i = 0; i <= pfti_num_tile_groups_in_patch_frame_minus1; i++ ) | |
|     pfti_tile_group_id[ i ] | u(v) |
| } | |
| } | | partitions_present_flag indicates whether a point cloud is partitioned or not.

tile_group_num_occupied_tiles_minus1[i] indicates a number of occupied tiles inside an i-th tile group.

tile_group_occupied_tile_index[i][j] indicates an index (a location in a tile group) of a j-th tile of an i-th tile group.

tile_group_bounding_box_min_x[i] indicates a minimum of an x-coordinate of a bounding box of a partition i at a CPCS level.

tile_group_bounding_box_max_x[i] indicates a maximum of the x-coordinate of the bounding box of the partition i at the CPCS level.

tile_group_bounding box_min_y[i] indicates a minimum of a y-coordinate of the bounding box of the partition i at the CPCS level.

tile_group_bounding_box_max_y[i] indicates a maximum of the y-coordinate of the bounding box of the partition i at the CPCS level.

tile_group_bounding_box_min_z[i] indicates a minimum of a z-coordinate of the bounding box of the partition i at the CPCS level.

tile_group_bounding_box_max_z[i] indicates a maximum of the z-coordinate of the bounding box of the partition i at the CPCS level.

Decoding Process for Tile Groups

Inputs to a decoding process for tile groups includes 1) a flag that indicates if partitions are present, 2) a super bounding box corresponding to each tile group and 3) a location of occupied tiles for each tile group.

If cloud partitions are present, a decoder knows that each tile group contains only a single partition. The decodes also knows a super bounding box corresponding to each tile group, based on which the decoder can decide either to decode or skip decoding of the partition. The decoder can also decode locations of occupied and unoccupied tiles that may be used for decoding.

FIG. 7A is a flowchart illustrating a method 700 of dynamic point cloud partition packing, according to embodiments.

In some implementations, one or more process blocks of FIG. 7A may be performed by the PCC decompressor 210. In some implementations, one or more process blocks of FIG. 7A may be performed by another device or a group of devices separate from or including the PCC decompressor 210, such as the PCC compressor 203.

Referring to FIG. 7A, in operation 710, the method 700 includes obtaining one or more region of interest (ROI) patches from an ROI of a point cloud.

In operation 720, the method 700 includes attempting to pack, into one among tiles of a tile map, one among the obtained one or more ROI patches, in a tile scan order.

In operation 730, the method 700 includes identifying whether the one among the one or more ROI patches is packed successfully into the one among the tiles.

In operation 740, the method 700 includes, based on the one among the one or more ROI patches being determined to be not packed successfully into the one among the tiles, chunking the one among the one or more ROI patches into multiple ROI patches.

The method 700 may further include attempting to pack, into the one among the tiles, one among the multiple ROI patches into which the one among the one or more ROI patches is chunked, in the tile scan order, identifying whether the one among the multiple ROI patches is packed successfully into the one among the tiles, and based on the one among the multiple ROI patches being determined to be not packed successfully into the one among the tiles, chunking the one among the multiple ROI patches into a plurality of ROI patches.

The method 700 may further include partitioning the point cloud into multiple partitions, and packing each of the multiple partitions into which the point cloud is partitioned, into a set of the tiles that is not shared by any of the multiple partitions.

The method 700 may further include partitioning the point cloud into multiple partitions, obtaining, for each of the multiple partitions into which the point cloud is partitioned, a maximum number of tiles in a frame to be used to pack a respective one of the multiple partitions, among a group of frames, and packing each of the multiple partitions into the maximum number of tiles obtained for a respective one of the multiple partitions, in each of the group of frames.

The method 700 may further include partitioning the point cloud into multiple partitions, and packing each of the multiple partitions into which the point cloud is partitioned, into a group of tiles that is not shared by any of the multiple partitions and remains the same for all frames in a group of frames.

The method 700 may further include transmitting information of a super bounding box for the group of tiles into which a respective one of the multiple partitions is packed, the super bounding box comprising all tiles into which the respective one of the multiple partitions is packed for all frames in the group of frames.

The method 700 may further include, based on the one among the one or more ROI patches being determined to be packed successfully into the one among the tiles, transmitting an index of the one among the tiles.

Although FIG. 7A shows example blocks of the method 700, in some implementations, the method 700 may include additional blocks, fewer blocks, different blocks, or differently arranged blocks than those depicted in FIG. 7A. Additionally, or alternatively, two or more of the blocks of the method 700 may be performed in parallel.

Further, the proposed methods may be implemented by processing circuitry (e.g., one or more processors or one or more integrated circuits). In an example, the one or more processors execute a program that is stored in a non-transitory computer-readable medium to perform one or more of the proposed methods.

Figure 7B:
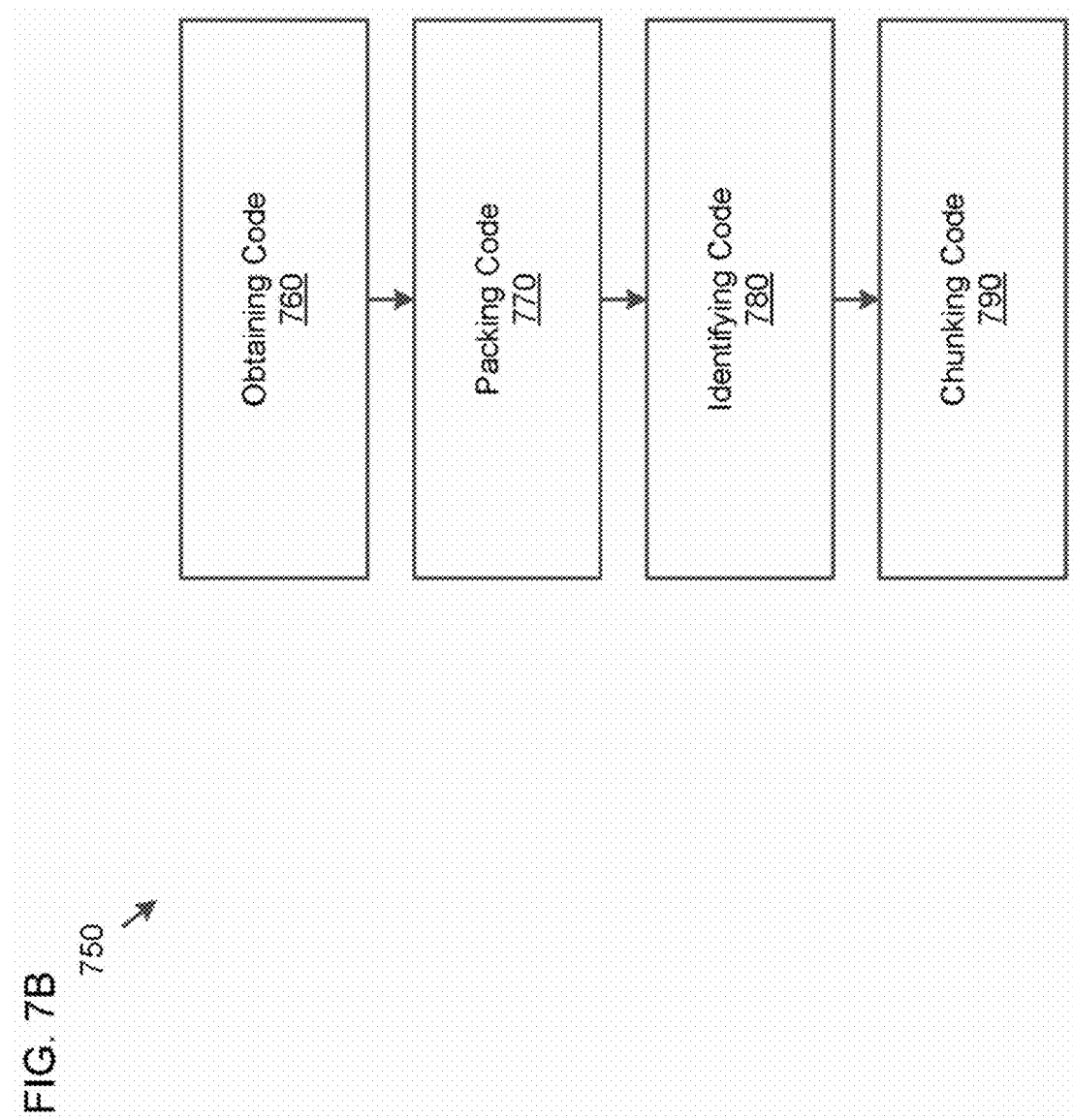
FIG. 7B is a block diagram of an apparatus for dynamic point cloud partition packing, according to embodiments.

FIG. 7B is a block diagram of an apparatus 750 for dynamic point cloud partition packing, according to embodiments.

Referring to FIG. 7B, the apparatus 750 includes obtaining code 760, packing code 770, identifying code 780 and chunking code 790.

The obtaining code 760 is configured to cause at least one processor to obtain one or more region of interest (ROI) patches from an ROI of a point cloud.

The packing code 770 is configured to cause the at least one processor to attempt to pack, into one among tiles of a tile map, one among the obtained one or more ROI patches, in a tile scan order.

The identifying code 780 is configured to cause the at least one processor to identify whether the one among the one or more ROI patches is packed successfully into the one among the tiles.

The chunking code 790 is configured to cause the at least one processor to, based on the one among the one or more ROI patches being determined to be not packed successfully into the one among the tiles, chunk the one among the one or more ROI patches into multiple ROI patches.

The packing code 770 may be further configured to cause the at least one processor to attempt to pack, into the one among the tiles, one among the multiple ROI patches into which the one among the one or more ROI patches is chunked, in the tile scan order. The identifying code 780 may be further configured to cause the at least one processor to identify whether the one among the multiple ROI patches is packed successfully into the one among the tiles. The chunking code 790 may be further configured to cause the at least one processor to, based on the one among the multiple ROI patches being determined to be not packed successfully into the one among the tiles, chunk the one among the multiple ROI patches into a plurality of ROI patches.

The apparatus 750 may further include partitioning code configured to cause the at least one processor to partition the point cloud into multiple partitions. The packing code 770 may be further configured to cause the at least one processor to pack each of the multiple partitions into which the point cloud is partitioned, into a set of the tiles that is not shared by any of the multiple partitions.

The apparatus 750 may further include partitioning code configured to cause the at least one processor to partition the point cloud into multiple partitions. The obtaining code 760 may be further configured to cause the at least one processor to obtain, for each of the multiple partitions into which the point cloud is partitioned, a maximum number of tiles in a frame to be used to pack a respective one of the multiple partitions, among a group of frames. The packing code 770 may be further configured to cause the at least one processor to pack each of the multiple partitions into the maximum number of tiles obtained for a respective one of the multiple partitions, in each of the group of frames.

The apparatus 750 may further include partitioning code configured to cause the at least one processor to partition the point cloud into multiple partitions. The packing code 770 may be further configured to cause the at least one processor to pack each of the multiple partitions into which the point cloud is partitioned, into a group of tiles that is not shared by any of the multiple partitions and remains the same for all frames in a group of frames.

The apparatus 750 may further include transmitting code configured to cause the at least one processor to transmit information of a super bounding box for the group of tiles into which a respective one of the multiple partitions is packed, the super bounding box comprising all tiles into which the respective one of the multiple partitions is packed for all frames in the group of frames.

The apparatus 750 may further include transmitting code configured to cause the at least one processor to, based on the one among the one or more ROI patches being determined to be packed successfully into the one among the tiles, transmit an index of the one among the tiles.

Figure 8:
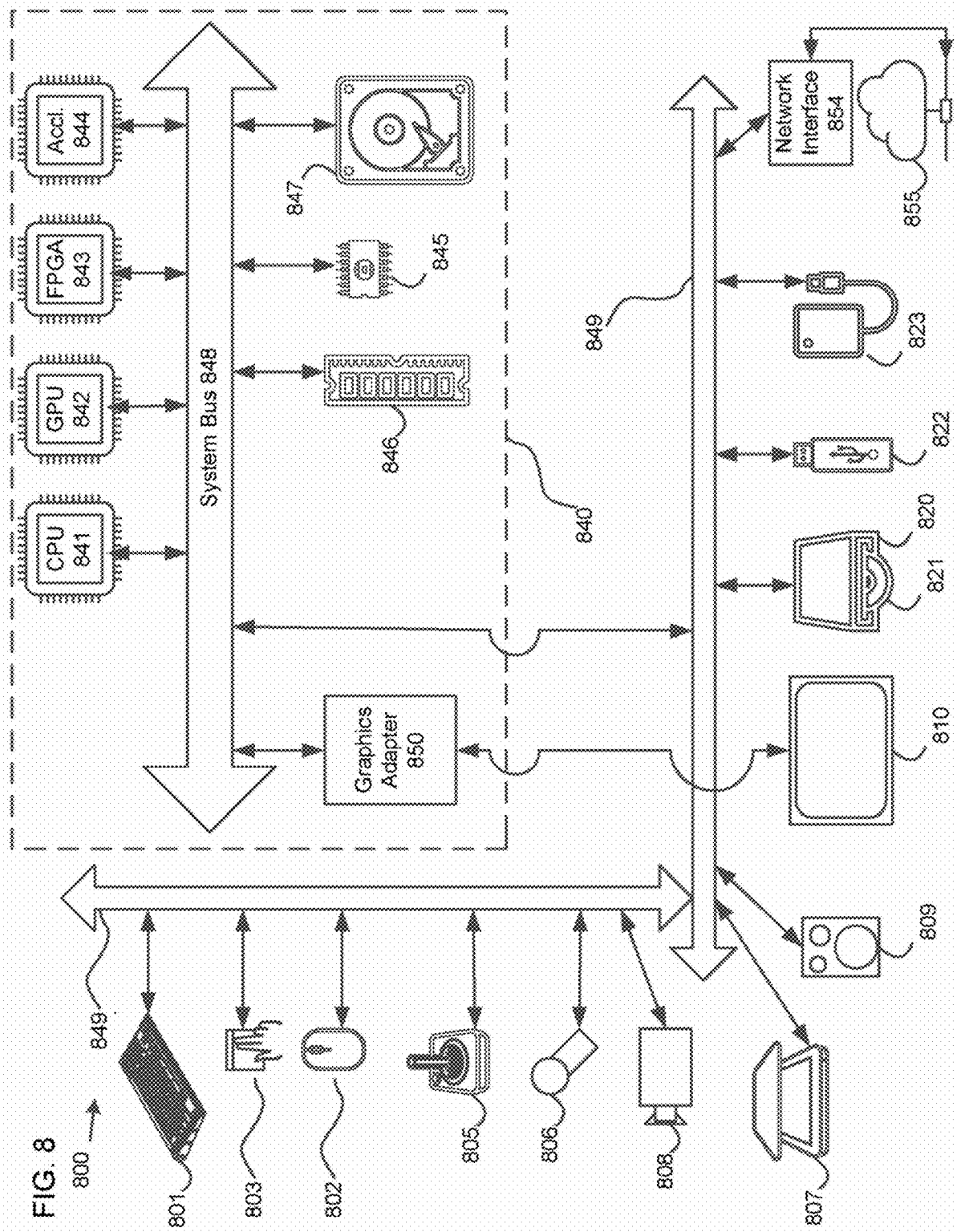
FIG. 8 is a diagram of a computer system suitable for implementing embodiments.

FIG. 8 is a diagram of a computer system 800 suitable for implementing embodiments.

Computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 8 for the computer system 800 are examples in nature and are not intended to suggest any limitation as to the scope of use or functionality of the computer software implementing the embodiments. Neither should the configuration of the components be interpreted as having any dependency or requirement relating to any one or combination of the components illustrated in the embodiments of the computer system 800.

The computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): a keyboard 801, a mouse 802, a trackpad 803, a touchscreen 810, a joystick 805, a microphone 806, a scanner 807, and a camera 808.

The computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touchscreen 810 or the joystick 805, but there can also be tactile feedback devices that do not serve as input devices), audio output devices (such as: speakers 809, headphones (not depicted)), visual output devices (such as screens 810 to include cathode ray tube (CRT) screens, liquid-crystal display (LCD) screens, plasma screens, organic light-emitting diode (OLED) screens, each with or without touchscreen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted). A graphics adapter 850 generates and outputs images to the touchscreen 810.

The computer system 800 can also include human accessible storage devices and their associated media such as optical media including a CD/DVD ROM/RW drive 820 with CD/DVD or the like media 821, a thumb drive 822, a removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

The computer system 800 can also include interface(s) to one or more communication networks 855. The communication networks 855 can for example be wireless, wireline, optical. The networks 855 can further be local, wide-area, metropolitan, vehicular and industrial, real-time, delay-tolerant, and so on. Examples of the networks 855 include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. The networks 855 commonly require external network interface adapters that attached to certain general purpose data ports or peripheral buses 849 (such as, for example universal serial bus (USB) ports of the computer system 800; others are commonly integrated into the core of the computer system 800 by attachment to a system bus as described below, for example, a network interface 854 including an Ethernet interface into a PC computer system and/or a cellular network interface into a smartphone computer system. Using any of these networks 855, the computer system 800 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks 855 and network interfaces 854 as described above.

Aforementioned human interface devices, human-accessible storage devices, and network interfaces 854 can be attached to a core 840 of the computer system 800.

The core 840 can include one or more Central Processing Units (CPU) 841, Graphics Processing Units (GPU) 842, specialized programmable processing units in the form of Field Programmable Gate Areas (FPGA) 843, hardware accelerators 844 for certain tasks, and so forth. These devices, along with read-only memory (ROM) 845, random-access memory (RAM) 846, internal mass storage 847 such as internal non-user accessible hard drives, solid-state drives (SSDs), and the like, may be connected through a system bus 848. In some computer systems, the system bus 848 can be accessible in the form of one or more physical plugs to enable extensions by additional CPUs, GPU, and the like. The peripheral devices can be attached either directly to the core's system bus 848, or through the peripheral buses 849. Architectures for a peripheral bus include peripheral component interconnect (PCI), USB, and the like.

The CPUs 841, GPUs 842, FPGAs 843, and hardware accelerators 844 can execute certain instructions that, in combination, can make up the aforementioned computer code. That computer code can be stored in the ROM 845 or RAM 846. Transitional data can also be stored in the RAM 846, whereas permanent data can be stored for example, in the internal mass storage 847. Fast storage and retrieve to any of the memory devices can be enabled through the use of cache memory, that can be closely associated with the CPU 841, GPU 842, internal mass storage 847, ROM 845, RAM 846, and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system 800 having architecture, and specifically the core 840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 840 that are of non-transitory nature, such as the core-internal mass storage 847 or ROM 845. The software implementing various embodiments can be stored in such devices and executed by the core 840. A computer-readable medium can include one or more memory devices or chips, according to particular needs. The software can cause the core 840 and specifically the processors therein (including CPU, GPU, FPGA, and the like) to execute particular processes or particular parts of particular processes described herein, including defining data structures stored in the RAM 846 and modifying such data structures according to the processes defined by the software. In addition or as an alternative, the computer system can provide functionality as a result of logic hardwired or otherwise embodied in a circuit (for example: the hardware accelerator 844), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

While this disclosure has described several embodiments, there are alterations, permutations, and various substitute equivalents, which fall within the scope of the disclosure. It will thus be appreciated that those skilled in the art will be able to devise numerous systems and methods that, although not explicitly shown or described herein, embody the principles of the disclosure and are thus within the spirit and scope thereof.

The invention claimed is:

1. A method of dynamic point cloud partition packing, the method being performed by at least one processor, and the method comprising:
   obtaining one or more region of interest (ROI) patches from an ROI of a point cloud;
   attempting to pack, into one among tiles of a tile map, one among the obtained one or more ROI patches, in a tile scan order;
   identifying whether the one among the one or more ROI patches is packed successfully into the one among the tiles;
   based on the one among the one or more ROI patches being determined to be not packed successfully into the one among the tiles, chunking the one among the one or more ROI patches into multiple ROI patches;
   partitioning the point cloud into multiple partitions comprising a first partition and a second partition;
   obtaining, for each of the multiple partitions into which the point cloud is partitioned, a maximum number of tiles in a frame to be used to pack a respective one of the multiple partitions, among a group of frames, the maximum number of tiles for the first partition being different than the maximum number of tiles for the second partition; and
   packing each of the multiple partitions into the maximum number of tiles obtained for a respective one of the multiple partitions, in each of the group of frames, so that each of the maximum number of tiles for the first partition and the maximum number of tiles for the second partition is not shared by any of the multiple partitions and remains the same for all frames in the group of frames.

2. The method of claim 1, further comprising:
   attempting to pack, into the one among the tiles, one among the multiple ROI patches into which the one among the one or more ROI patches is chunked, in the tile scan order;
   identifying whether the one among the multiple ROI patches is packed successfully into the one among the tiles; and
   based on the one among the multiple ROI patches being determined to be not packed successfully into the one among the tiles, chunking the one among the multiple ROI patches into a plurality of ROI patches.

3. The method of claim 1, further comprising transmitting information of a super bounding box for the group of tiles into which a respective one of the multiple partitions is packed, the super bounding box comprising all tiles into which the respective one of the multiple partitions is packed for all frames in the group of frames.

4. The method of claim 1, further comprising, based on the one among the one or more ROI patches being determined to be packed successfully into the one among the tiles, transmitting an index of the one among the tiles.

5. An apparatus for dynamic point cloud partition packing, the apparatus comprising:
   at least one memory configured to store computer program code; and
   at least one processor configured to access the at least one memory and operate according to the computer program code, the computer program code comprising:
      obtaining code configured to cause the at least one processor to obtain one or more region of interest (ROI) patches from an ROI of a point cloud;
      packing code configured to cause the at least one processor to attempt to pack, into one among tiles of a tile map, one among the obtained one or more ROI patches, in a tile scan order;
      identifying code configured to cause the at least one processor to identify whether the one among the one or more ROI patches is packed successfully into the one among the tiles;
      chunking code configured to cause the at least one processor to, based on the one among the one or more ROI patches being determined to be not packed successfully into the one among the tiles, chunk the one among the one or more ROI patches into multiple ROI patches; and
      partitioning code configured to cause the at least one processor to partition the point cloud into multiple partitions comprising a first partition and a second partition,
   wherein the obtaining code is further configured to cause the at least one processor to obtain, for each of the multiple partitions into which the point cloud is partitioned, a maximum number of tiles in a frame to be used to pack a respective one of the multiple partitions, among a group of frames, the maximum number of tiles for the first partition being different than the maximum number of tiles for the second partition, and
   the packing code is further configured to cause the at least one processor to pack each of the multiple partitions into the maximum number of tiles obtained for a respective one of the multiple partitions, in each of the group of frames, so that each of the maximum number of tiles for the first partition and the maximum number of tiles for the second partition is not shared by any of the multiple partitions and remains the same for all frames in the group of frames.

6. The apparatus of claim 5, wherein the packing code is further configured to cause the at least one processor to attempt to pack, into the one among the tiles, one among the multiple ROI patches into which the one among the one or more ROI patches is chunked, in the tile scan order,
   the identifying code is further configured to cause the at least one processor to identify whether the one among the multiple ROI patches is packed successfully into the one among the tiles, and
   the chunking code is further configured to cause the at least one processor to, based on the one among the multiple ROI patches being determined to be not packed successfully into the one among the tiles, chunk the one among the multiple ROI patches into a plurality of ROI patches.

7. The apparatus of claim 5, further comprising transmitting code configured to cause the at least one processor to transmit information of a super bounding box for the group of tiles into which a respective one of the multiple partitions is packed, the super bounding box comprising all tiles into which the respective one of the multiple partitions is packed for all frames in the group of frames.

8. The apparatus of claim 5, further comprising transmitting code configured to cause the at least one processor to, based on the one among the one or more ROI patches being determined to be packed successfully into the one among the tiles, transmit an index of the one among the tiles.

9. A non-transitory computer-readable storage medium storing instructions that cause at least one processor to:
- obtain one or more region of interest (ROI) patches from an ROI of a point cloud;
- attempt to pack, into one among tiles of a tile map, one among the obtained one or more ROI patches, in a tile scan order;
- identify whether the one among the one or more ROI patches is packed successfully into the one among the tiles;
- based on the one among the one or more ROI patches being determined to be not packed successfully into the one among the tiles, chunk the one among the one or more ROI patches into multiple ROI patches;
- partition the point cloud into multiple partitions comprising a first partition and a second partition;
- obtain, for each of the multiple partitions into which the point cloud is partitioned, a maximum number of tiles in a frame to be used to pack a respective one of the multiple partitions, among a group of frames, the maximum number of tiles for the first partition being different than the maximum number of tiles for the second partition; and
- pack each of the multiple partitions into the maximum number of tiles obtained for a respective one of the multiple partitions, in each of the group of frames, so that each of the maximum number of tiles for the first partition and the maximum number of tiles for the second partition is not shared by any of the multiple partitions and remains the same for all frames in the group of frames.

10. The non-transitory computer-readable storage medium of claim 9, wherein the instructions further cause the at least one processor to:
- attempt to pack, into the one among the tiles, one among the multiple ROI patches into which the one among the one or more ROI patches is chunked, in the tile scan order;
- identify whether the one among the multiple ROI patches is packed successfully into the one among the tiles; and
- based on the one among the multiple ROI patches being determined to be not packed successfully into the one among the tiles, chunk the one among the multiple ROI patches into a plurality of ROI patches.

11. The non-transitory computer-readable storage medium of claim 9, wherein the instructions further cause the at least one processor to transmit information of a super bounding box for the group of tiles into which a respective one of the multiple partitions is packed, the super bounding box comprising all tiles into which the respective one of the multiple partitions is packed for all frames in the group of frames.

* * * * *